United States Patent [19]

Allard

[11] Patent Number: 4,740,216
[45] Date of Patent: Apr. 26, 1988

[54] DEVICE FOR THE GASIFICATION OF WASTE

[75] Inventor: Georges A. L. Allard, Embourg-Chaudfontaine, Belgium

[73] Assignee: Cokerill Mechanical Industries, Inc., Belgium

[21] Appl. No.: 857,750

[22] PCT Filed: Jul. 8, 1985

[86] PCT No.: PCT/BE85/00014
§ 371 Date: Mar. 13, 1986
§ 102(e) Date: Mar. 13, 1986

[87] PCT Pub. No.: WO86/00634
PCT Pub. Date: Jan. 30, 1986

[30] Foreign Application Priority Data

Jul. 16, 1984 [LU] Luxembourg ............ 85468

[51] Int. Cl.4 ............................................. C10J 3/68
[52] U.S. Cl. ........................................... 48/76; 48/63; 48/64; 48/89; 122/4 D; 110/245; 422/141; 422/142; 422/143; 201/31
[58] Field of Search ............. 48/62 R, 63, 64, 76, 48/77, 89; 110/245; 122/4 D; 201/31; 422/141–143, 146; 55/DIG. 29

[56] References Cited

U.S. PATENT DOCUMENTS

| | | | |
|---|---|---|---|
| 3,454,383 | 7/1969 | Pirsh et al. | 201/31 |
| 4,048,912 | 9/1977 | Walker | 55/DIG. 29 |
| 4,336,227 | 6/1982 | Koyama et al. | 422/139 |
| 4,388,082 | 6/1983 | Guttmann et al. | 48/76 |
| 4,405,339 | 9/1983 | Kunii | 48/62 R |
| 4,436,057 | 3/1984 | Cross et al. | 110/245 |
| 4,464,247 | 8/1984 | Thacker | 422/142 |
| 4,505,230 | 3/1985 | Caplin | 122/4 D |

FOREIGN PATENT DOCUMENTS 0072102  2/1983 European Pat. Off. .
7900009  1/1979 PCT Int'l Appl. .

*Primary Examiner*—David L. Lacey
*Attorney, Agent, or Firm*—Fishman & Dionne

[57] ABSTRACT

A device for the gasification of waste, particularly light waste, is comprised of a reactor having a single fluidized bed including two concentric chambers communicating at the top and bottom wherein the outer chamber is intended to implement the pyrolysis of supplied waste and the inner chamber is intended to implement the combustion of pyrolyzed materials. A circulation of pyrolysis gas and combustion gas is established between the outer chamber and the inner chamber.

18 Claims, 2 Drawing Sheets

DEVICE FOR THE GASIFICATION OF WASTE

The present invention relates to a device for the gasification of waste, especially light waste such as wood chips, paper and plant waste, which consists of a fluidized bed reactor in which a pyrolysis takes place, followed by combustion of the waste.

Although various types of fluidized bed reactors for the gasification of waste are already known, the present invention is aimed at providing a new type of reactor which is essentially suitable for the gasification of light products such as paper and plastic residues, wood chips and plant waste, and the like.

According to the present invention, the device for the gasification of waste consists of two concentric chambers, each chamber having a bottom portion with the two concentric chambers communicating through their respective bottom portions, wherein a first chamber, called a pyrolysis chamber, is intended to implement the pyrolysis of the waste supplied, and wherein the other chamber, called a combustion chamber, is intended to implement the combustion of the matter subjected to pyrolysis in the first chamber, the combustion being maintained by a stream of air with or without steam under pressure, which entrains the pyrolyzed matter from the pyrolysis chamber into the combustion chamber by induction through the bottom, the fluidized bed of the pyrolysis chamber being supplied by a part of the pyrolysis and/or combustion gases which is recycled and heated beforehand in the combustion chamber, and the fluidized bed in the combustion chamber being supplied by said stream of air with or without steam under pressure.

According to a preferred embodiment of the present invention, the device for the gasification of waste consists of two concentric chambers communicating at the bottom, wherein the outer chamber forms the pyrolysis chamber and wherein the inner chamber forms the combustion chamber.

According to a preferred embodiment of the present invention, a part of the mixture of the recycled pyrolysis and combustion gases passes through a heat exchanger which forms the dividing wall between the inner and outer chambers, before being conveyed to the fluidization device of the pyrolysis chamber.

Advantageously, the fluidized bed of the pyrolysis chamber contains a refractory, noncombustible substance with a weight similar to that of the waste, for example expanded clay beads or chamotte beads, which act as a heat carrier.

It is thus found that, according to the invention, a circulation is established between the pyrolysis chamber and the combustion chamber, by virtue of the induction of the matter from the pyrolysis chamber via the bottom, due to the relative velocity of the air and/or of the steam injected into the combustion chamber in relation to the velocity of the fluidizing gases in the pyrolysis chamber; this giving rise to differences in the apparent density between the two beds.

The combustion is advantageously controlled by adjustment of the relative flow rates of each of the gases and, in particular, by the speed of rotation of a fan which may be provided for injecting the air or the rate of flow of steam into the combustion chamber, for example the lower chamber.

By virtue of the advantageous arrangement of the gasification device of the invention, the temperature of the fluidized bed in the pyrolysis chamber is easily kept constant. In fact, the expanded clay beads, which accumulate heat, are also entrained in the circulation described above and are thus reheated in the combustion chamber before moving into the pyrolysis chamber, where they are again drawn via the bottom into the combustion chamber with the other waste. Furthermore, the fluidizing gases in the pyrolysis chamber are hot gases which are recovered and preheated once again by a heat exchanger arranged in the combustion chamber.

BRIEF DESCRIPTION OF THE DRAWINGS

Other details and advantages will become more clearly apparent from the reading of the following examples, described with the aid of the figures, in which.

DESCRIPTION OF THE PREFERRED EMBODIMENT

Figure 1:
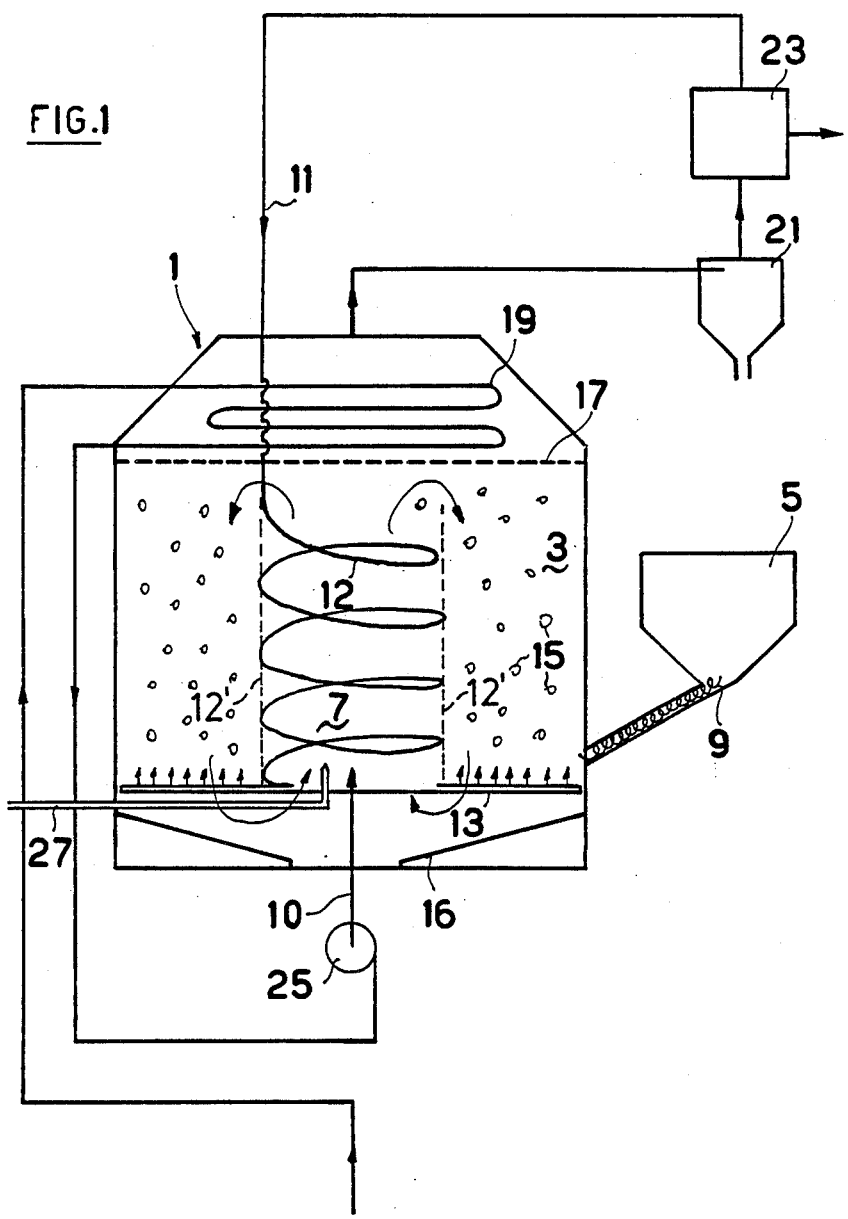
FIG. 1 is an embodiment of the gasification device of the present invention.

With reference to FIG. 1, the device for the gasification of waste according to the present invention consists of a single fluidized bed reactor 1 which is responsible for the pyrolysis and combustion of the waste. The said gasification device consists of two concentric chambers communicating at the bottom, wherein the outer chamber 3 is intended to implement the pyrolysis of the waste supplied at the periphery by a feeder device 5 known per se, and the inner chamber 7 is intended to implement the combustion of the matter subjected to pyrolysis in the outer chamber 3. The device according to the invention is advantageously supplied with waste which is shredded and ground in a homogeneous manner and which is introduced into the peripheral outer chamber 3 by means of a screw 9, for example.

The combustion is maintained by a stream of air and/or steam under pressure through line 10 which entrains the pyrolyzed matter from the outer chamber 3 into the combustion chamber 7 by induction via the bottom, and the fluidized bed in the outer chamber 3 is supplied by a part of the recycled pyrolysis and/or combustion gases which are recycled through line 11 and are heated beforehand in the inner chamber 7 by passing through a heat exchanger 12 which partly forms, if appropriate, the dividing wall 12' between the inner chamber 7 and the outer chamber 3. The fluidized bed in the inner chamber, called a combustion chamber, is supplied by the stream of air and/or steam through line 10 which is responsible for the induction and the circulation at the same time.

Advantageously, the fluidization device in the outer chamber 3 consists of several perforated pipes arranged in the form of a star 13 whose perforations face upwards and in which the fluidizing gas of the outer chamber 3 is distributed on arriving from the exchanger 12. It is quite obvious that the invention is not limited to this embodiment and that the fluidization device 13 can also consist of a perforated pipe wound into a spiral, for example.

Preferably, the fluidized bed of the outer chamber 3 contains charge substances such as small expanded clay beads 15 which act as a heat regulator. In fact, the latter are also drawn into the combustion chamber and are reheated therein before passing back into the outer chamber 3.

Advantageously, the gasification device according to the invention also comprises, in its lower part, a device for the recovery of ash. Similarly, it may be fitted, in its upper part, with a grid 17, which prevents excessively light matter such as, for example paper, from being blown out.

According to a preferred embodiment of the present invention, the air and/or steam injected into the combustion chamber are preheated in a heat exchanger 19 arranged in the combustion and/or pyrolysis gas circuit. Given that the temperature of the combustion and/or pyrolysis gases is of the order of 6° to 700° C., the combustion air can be reheated to a temperature of the order of 400° C.

According to a particularly advantageous embodiment, the combustion and/or pyrolysis gases are recycled into a cyclone dust-extractor 21 and, if appropriate, then into a wet dust-extractor 23, before they are recycled, at least partly, as the fluidizing gas in the outer chamber 3.

Furthermore, the rate of combustion can advantageously be readily controlled by the speed of rotation of the fan 25 arranged in the circuit for injecting air and/or steam into the combustion chamber 7.

The energy recovered from the gasification device according to the present invention can be heat energy removed from the hot gases, which is used to generate steam, for example, which can be injected into the combustion chamber 7; it may also be the energy stored in the rich gases originating from the pyrolysis, which can be employed to drive a gas turbine or which can be burnt in a boiler in order to produce steam.

The gasification device according to the present invention can obviously be equipped with a series of supplementary devices, especially devices intended for starting the unit. Thus, it may be fitted with a gas manifold 27 which is intended for starting the combustion. Furthermore, during starting-up, the fluidization of the bed can take place by virtue of an injection of air by means of a supplementary device which is not shown.

Figure 2:
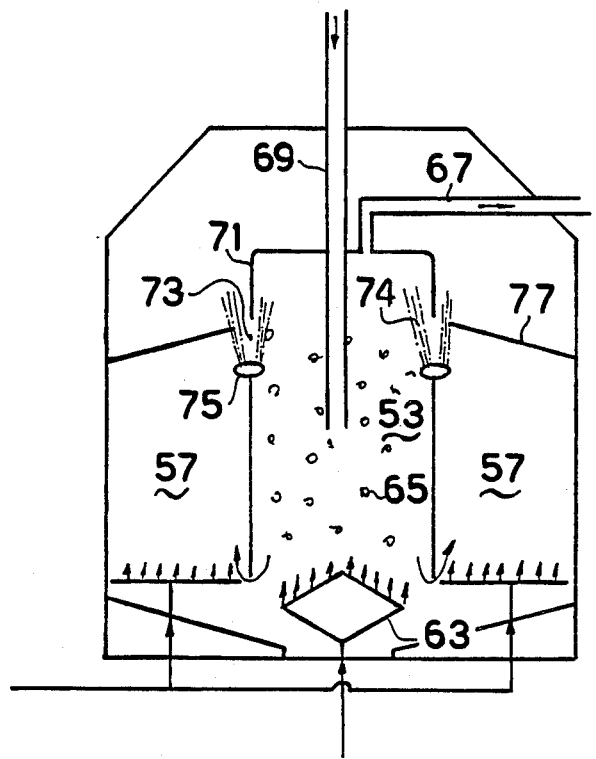
FIG. 2 is an alternative form of embodiment according to the invention.

According to another embodiment of the invention (FIG. 2), the inner chamber forms the pyrolysis chamber 53 and the outer chamber forms the combustion chamber 57. As previously, the matter and the pyrolysis gas are drawn into the outer combustion chamber 57 via the bottom, but the combustible matter is supplied via the center by means of a central feeding and fluidizing device 63.

To prevent the rich, recoverable pyrolysis gases from mixing with the combustion gases, a cover 71 having a pyrolysis gas outlet duct 67 may be provided over at least the central chamber of the gasification device according to the invention, a passage section 73 being maintained between the top parts of both chambers. Advantageously, a duct 69, which is extended into the fluidized bed of the central chamber, and which promotes circulation, passes through the cover 71.

To prevent the gases from crossing this passage section 73 with the solid matter, the section can comprise an air gas barrier which allows solid particles to pass therethrough while precluding the passage of gas. Such a gas barrier can advantageously consist of a single air, gas or steam jet or of two jets, arranged one on either side of the dividing wall.

To this end, the top part of the central chamber, immediately below the passage section, has a ring seal 75 with a hollow cross-section and equipped with at least one series of perforations on at least one side of the dividing wall or of the lower edge of the cover 71.

In an alternative form, the peripheral chamber can also comprise baffles 77 sloping downwards or away from the center.

It is quite obvious that the present invention is not limited to the described embodiments but extends to the scope defined by the claims.

What is claimed is:

1. A device for the gasification of waste material comprising a single fluidized bed reactor, the fluidized bed reactor comprising:

first and second concentric chambers, each of said chambers having a bottom portion and a top portion with said chambers communicating through said respective bottom and top portions wherein said first chamber is a pyrolysis chamber for the pyrolysis of waste material and said second chamber is a combustion chamber for the combustion of waste material pyrolyzed in said first chamber;

particles in at least one of said first and second chambers;

means for delivering waste material into said pyrolysis chamber wherein the waste material is pyrolyzed and forms pyrolysis gas;

means for delivering a pressurized fluid stream which entrains the pyrolyzed material from said pyrolysis chamber and transfers the pyrolyzed material from the bottom portion of said pyrolysis chamber to the bottom portion of said combustion chamber wherein combustion gas is formed, the combustion and pyrolysis gases mixing and flowing between said first and second concentric chambers through said communicating top and bottom portions;

means for recycling at least a portion of the pyrolysis and combustion gases from said pyrolysis and combustion chambers;

means for delivering the at least a portion of recycled pyrolysis and combustion gases to the bottom portion of said pyrolysis chamber; and outlet means for exhausting at least the pyrolysis gases.

2. The gasification device of claim 1 wherein:

said pyrolysis chamber is the outer one of the concentric chambers;

said combustion chamber is the inner one of the concentric chambers; and said waste material delivery means communicates with said outer chamber.

3. The gasification device of claim 1 wherein:

said pyrolysis chamber is the inner one of the concentric chambers;

said combustion chamber is the outer one of the concentric chambers; and said waste material delivery means communicates with said inner chamber.

4. The gasification device of claim 3 including:

cover means spaced from a top portion of said inner pyrolysis chamber to define a passage between said inner and outer chambers.

5. The gasification devcie of claim 4 including:

baffle means on a top portion of said outer combustion chamber sloping downwardly away from said inner chamber.

6. The gasification device of claim 4 including:

means for forming a gas barrier in said passage wherein gas is precluded from passing therethrough while solid particles may pass therethrough.

7. The gasification device of claim 1 including:
heating means positioned and arranged with respect to said recycle means for heating the at least a portion of pyrolysis and combustion gases.

8. The gasification device of claim 7 further including a dividing wall positioned in said reactor so as to define said pyrolysis and combustion chambers and wherein:
said means for heating the at least a portion of recycled pyrolysis and combustion gases comprises a heat exchanger, said heat exchanger being connected to said dividing wall.

9. The gasification device of claim 1 wherein said means for delivering the at least a portion of recycled pyrolysis and combustion gases to the bottom portion of said pyrolysis chamber comprises:
perforated pipe means having a plurality of upwardly facing perforations therein, said perforated pipe means located in said bottom portion of said pyrolysis chamber.

10. The gasification device of claim 9 wherein:
said perforated pipe means has a star shape.

11. The gasification device of claim 9 wherein:
said perforated pipe means has a spiral shape.

12. The gasification device of claim 1 wherein:
said particles are in said pyrolysis chamber.

13. The gasification of claim 12 wherein:
said particles comprise clay beads.

14. The gasification device of claim 1 including:
means for recovering ash resulting from the waste material being pyrolyzed and combusted.

15. The gasification device of claim 1 including:
heat exchanger means for preheating the pressurized fluid stream which is delivered through said means for delivering the pressurized fluid stream.

16. The gasification device of claim 1 wherein said recycling means includes:
cyclone dust extractor means for extracting dust from the at least a portion of pyrolysis and combustion gases.

17. The gasification device of claim 1 wherein said recycling means includes:
wet dust extractor means for extracting dust from the at least a portion of pyrolysis and combustion gases.

18. The gasification device of claim 1 including:
grid means over said first and second concentric chambers to prevent solid particles from passing therethrough.

* * * * *